US012659912B2

(12) United States Patent　(10) Patent No.: US 12,659,912 B2
Tayyab et al.　(45) Date of Patent: Jun. 16, 2026

(54) POSITIONING WITH DISCONTINUOUS RECEPTION

(71) Applicant: Nokia Technologies Oy, Espoo (FI)

(72) Inventors: Muhammad Tayyab, Oulu (FI); Satya Krishna Joshi, Oulu (FI)

(73) Assignee: Nokia Technologies Oy, Espoo (FI)

( * ) Notice: Subject to any disclaimer, the term of this patent is extended or adjusted under 35 U.S.C. 154(b) by 311 days.

(21) Appl. No.: 18/441,522

(22) Filed: Feb. 14, 2024

(65) Prior Publication Data

US 2024/0276429 A1　Aug. 15, 2024

(30) Foreign Application Priority Data

Feb. 15, 2023　(FI) ..................................... 20235158

(51) Int. Cl.
　*H04W 64/00*　(2009.01)
　*H04W 76/28*　(2018.01)

(52) U.S. Cl.
　CPC ........... *H04W 64/00* (2013.01); *H04W 76/28* (2018.02)

(58) Field of Classification Search
　CPC .............................. H04W 64/00; H04W 76/28
　See application file for complete search history.

(56) References Cited

U.S. PATENT DOCUMENTS

| | | | |
|---|---|---|---|
| 11,895,728 B2 * | 2/2024 | Bao ........................ | H04W 76/28 |
| 2020/0029302 A1 * | 1/2020 | Cox ................... | H04W 52/0216 |

| | | | |
|---|---|---|---|
| 2021/0050978 A1 | 2/2021 | Alexandros | |
| 2021/0112474 A1 | 4/2021 | Manolakos et al. | |
| 2021/0360733 A1 * | 11/2021 | Bao ........................ | H04W 76/28 |
| 2021/0410063 A1 | 12/2021 | Jingchao et al. | |
| 2022/0006583 A1 | 1/2022 | Manolakos et al. | |
| 2022/0046748 A1 | 2/2022 | Jie et al. | |
| 2022/0053424 A1 | 2/2022 | Bao et al. | |
| 2022/0061122 A1 | 2/2022 | Jingchao et al. | |
| 2022/0109466 A1 | 4/2022 | Manolakos et al. | |
| 2023/0103460 A1 * | 4/2023 | Manolakos ........... | H04W 64/00 370/311 |
| 2024/0334535 A1 * | 10/2024 | Yerramalli ............ | H04W 64/00 |

FOREIGN PATENT DOCUMENTS

| | | |
|---|---|---|
| WO | WO 2019/068312 A1 | 4/2019 |
| WO | WO 2021/154848 A1 | 8/2021 |
| WO | WO 2021/232345 A1 | 11/2021 |
| WO | WO 2022/009160 A1 | 1/2022 |

OTHER PUBLICATIONS

FI Search Report—20235158 dated Aug. 23, 2023, 2 pgs.

(Continued)

*Primary Examiner* — David Bilodeau

(74) *Attorney, Agent, or Firm* — Lippes Mathias LLP

(57)　ABSTRACT

When discontinuous reception is used with positioning and reference signals for positioning are received in a plurality of frequency bins, it may be that a frequency bin is missed. That may decrease an accuracy of the positioning. Hence, an apparatus receiving the reference signals, when determining that one or more frequency bins are missed, may use, when one or more conditions are met, earlier values per a missed frequency bin, when estimating at least one characteristic for positioning.

13 Claims, 4 Drawing Sheets

(56)          References Cited

OTHER PUBLICATIONS

FI 1$^{st}$ Office Action—20235158 dated Aug. 23, 2023, 8 pgs.
Van De Beek et al., "On Channel Estimation in OFDM Systems",
Proceedings of Vehicular Technology Conference (VTC '95), vol. 2,
pp. 815-819, Chicago, USA, Sep. 1995.
Ericsson, "Views on the scope of Rel-18 Expanded and improved
NR positioning Wi", 3GPP TSG-RAN Meeting #98-e, Dec. 12 -16,
2022, RP-223286, 11 pgs.
Vivo, "Discussion on RedCap Positioning" 3GPP TSG-RAN WG2
119-bis-e E-Meeting, Oct. 10-19, 2022, R2-2209563, XP052262892
3 pgs.
Huawei et al., "Discussion on RedCap Positioning" 3GPP TSG-
RAN WG2 #119-bis-e E-meeting, Oct. 10-19, 2022, R2-2209643,
4 pgs.

* cited by examiner

POSITIONING WITH DISCONTINUOUS RECEPTION

TECHNICAL FIELD

Various example embodiments relate to wireless communications.

BACKGROUND

Communication systems are under constant development. The 5G, 5G-Advanced, and beyond future wireless networks aim to support a large variety of services, use cases and industrial verticals, some of them with accurate positioning performance requirements, even in use cases where saving power by means of discontinuous reception is of importance.

SUMMARY

The independent claims define the scope.

According to an aspect there is provided an apparatus comprising: means for receiving from a wireless network a discontinuous reception configuration, which defines at least an occurrence cycle of a period, during which the apparatus at least monitors transmissions towards the apparatus in the wireless network; means for receiving a positioning configuration for receiving at least reference signals for positioning the apparatus, the positioning configuration defining a plurality of frequency bins for the reference signals, and at least one characteristic whose value is to be estimated based on one or more channel characteristics; means for monitoring during occurrences of the period at least reference signals according to the positioning configuration; means for receiving, during one or more periods, within a reception occurrence, reference signals according to the positioning configuration; means for obtaining measurement results of the reference signals received during the reception occurrence; means for determining from the measurement results channel characteristic values for said one or more channel characteristics per a reference signal transmitting apparatus; means for storing the channel characteristic values at least temporarily with information indicating non-missed frequency bins; means for determining, whether any frequency bin of the plurality of frequency bins was missed during the reception occurrence; means for determining, in response to the one or more frequency bins being missed during the reception occurrence, whether one or more preset conditions are fulfilled, by comparing, using at least one non-missed frequency bin, per a channel characteristic, a difference between the channel characteristic value determined at the reception occurrence and a channel characteristic value determined and stored during a preceding reception occurrence of the missed frequency bin with a corresponding threshold; and means for estimating values for said at least one characteristic per a reference signal transmitting apparatus, the means for estimating being configured, in response to the one or more frequency bins being missed and the one or more preset conditions being fulfilled, to estimate, for said at least one characteristic, a value based on channel characteristic values of reference signals in non-missed frequency bins and, per a missed frequency bin, channel characteristic values determined and stored during a preceding reception occurrence of the missed frequency bin.

In embodiments, the apparatus further comprises means for determining, in response to the one or more frequency bins being missed during the reception occurrence, for at least one metric, per a metric, a metric value indicating a magnitude of a change of the channel characteristic value between the reception occurrence and at least one of preceding reception occurrences; wherein the means for determining, whether the one or more preset conditions are fulfilled, are configured to determine, per a metric, whether the metric value fulfills a corresponding preset metric condition.

In embodiments, the means for determining a metric value for the at least one metric are configured to determine metric values per a frequency bin that is a non-missed frequency bin in the reception occurrence and in the at least one of preceding reception occurrences.

In embodiments, the means for determining a metric value for the at least one metric are configured to determine metric values using average of non-missed frequency bins per a reception occurrence.

In embodiments, the means for determining, whether the one or more preset conditions are fulfilled, are configured to determine, per a metric group comprising the at least one metric, whether metric values fulfill a preset metric group condition.

In embodiments, the apparatus further comprises means for determining, based on positioning accuracy indicated, the preset metric group and the preset metric group condition.

In embodiments, the means for determining the metric value for the at least one metric are configured to determine the metric value in response to the one or more preset conditions being fulfilled.

In embodiments, the apparatus further comprises means for receiving in the positioning configuration information indicating the at least one metric.

In embodiments, the apparatus further comprises means for receiving in the positioning configuration at least one preset metric condition.

In embodiments, the apparatus further comprises means for generating, in response to the one or more frequency bins being missed during the reception occurrence, information reporting the reception occurrence to at least indicate the one or more frequency bins missed; means for generating a report comprising the values estimated, wherein the means are configured, in response to the one or more frequency bins being missed, to include the information generated to the report; and means for transmitting said report.

In embodiments, the reference signals are downlink reference signals for positioning.

In embodiments, the means comprise: at least one processor; and at least one memory storing instructions that, when executed by the at least one processor, cause the performance of the apparatus.

According to an aspect there is provided a method comprising: receiving from a wireless network a discontinuous reception configuration, which defines at least an occurrence cycle of a period, during which the apparatus at least monitors transmissions towards the apparatus in the wireless network; receiving a positioning configuration for receiving at least reference signals for positioning the apparatus, the positioning configuration defining a plurality of frequency bins for the reference signals, and at least one characteristic whose value is to be estimated based on one or more channel characteristics; monitoring during occurrences of the period at least reference signals according to the positioning configuration; receiving, during one or more periods within a reception occurrence reference signals according to the positioning configuration; obtaining measurement results of the reference signals received during the reception occurrence; determining from the measurement results channel characteristic values for said one or more channel characteristics per a reference signal transmitting apparatus; storing the channel characteristic values at least temporarily with information indicating non-missed frequency bins; determining, whether any frequency bin of the plurality of frequency bins was missed during the reception occurrence; determining, in response to the one or more frequency bins being missed during the reception occurrence, whether one or more preset conditions are fulfilled, by comparing, using at least one non-missed frequency bin, per a channel characteristic, a difference between the channel characteristic value determined at the reception occurrence and a channel characteristic value determined and stored during a preceding reception occurrence of the missed frequency bin with a corresponding threshold; and estimating values for said at least one characteristic per a reference signal transmitting apparatus, the estimating comprising, in response to the one or more frequency bins being missed and the one or more preset conditions being fulfilled, estimating, for said at least one characteristic, a value based on channel characteristic values of reference signals in non-missed frequency bins and, per a missed frequency bin, channel characteristic values determined and stored during a preceding reception occurrence of the missed frequency bin.

According to an aspect there is provided a computer readable medium comprising instructions, which, when executed by an apparatus, cause the apparatus to perform at least the following: receiving from a wireless network a discontinuous reception configuration, which defines at least an occurrence cycle of a period, during which the apparatus at least monitors transmissions towards the apparatus in the wireless network; receiving a positioning configuration for receiving at least reference signals for positioning the apparatus, the positioning configuration defining a plurality of frequency bins for the reference signals, and at least one characteristic whose value is to be estimated based on one or more channel characteristics; monitoring during occurrences of the period at least reference signals according to the positioning configuration; receiving, during one or more periods within a reception occurrence reference signals according to the positioning configuration; obtaining measurement results of the reference signals received during the reception occurrence; determining from the measurement results channel characteristic values for said one or more channel characteristics per a reference signal transmitting apparatus; storing the channel characteristic values at least temporarily with information indicating non-missed frequency bins; determining, whether any frequency bin of the plurality of frequency bins was missed during the reception occurrence; determining, in response to the one or more frequency bins being missed during the reception occurrence, whether one or more preset conditions are fulfilled, by comparing, using at least one non-missed frequency bin, per a channel characteristic, a difference between the channel characteristic value determined at the reception occurrence and a channel characteristic value determined and stored during a preceding reception occurrence of the missed frequency bin with a corresponding threshold; and estimating values for said at least one characteristic per a reference signal transmitting apparatus, the estimating comprising, in response to the one or more frequency bins being missed and the one or more preset conditions being fulfilled, estimating, for said at least one characteristic, a value based on channel characteristic values of reference signals in non-missed frequency bins and, per a missed frequency bin, channel characteristic values determined and stored during a preceding reception occurrence of the missed frequency bin.

characteristic values determined and stored during a preceding reception occurrence of the missed frequency bin.

In an embodiment, the computer readable medium is a non-transitory computer readable medium.

According to an aspect there is provided a computer program comprising instructions which, when executed by an apparatus, cause the apparatus to perform at least the following: receiving from a wireless network a discontinuous reception configuration, which defines at least an occurrence cycle of a period, during which the apparatus at least monitors transmissions towards the apparatus in the wireless network; receiving a positioning configuration for receiving at least reference signals for positioning the apparatus, the positioning configuration defining a plurality of frequency bins for the reference signals, and at least one characteristic whose value is to be estimated based on one or more channel characteristics; monitoring during occurrences of the period at least reference signals according to the positioning configuration; receiving, during one or more periods within a reception occurrence reference signals according to the positioning configuration; obtaining measurement results of the reference signals received during the reception occurrence; determining from the measurement results channel characteristic values for said one or more channel characteristics per a reference signal transmitting apparatus; storing the channel characteristic values at least temporarily with information indicating non-missed frequency bins; determining, whether any frequency bin of the plurality of frequency bins was missed during the reception occurrence; determining, in response to the one or more frequency bins being missed during the reception occurrence, whether one or more preset conditions are fulfilled, by comparing, using at least one non-missed frequency bin, per a channel characteristic, a difference between the channel characteristic value determined at the reception occurrence and a channel characteristic value determined and stored during a preceding reception occurrence of the missed frequency bin with a corresponding threshold; and estimating values for said at least one characteristic per a reference signal transmitting apparatus, the estimating comprising, in response to the one or more frequency bins being missed and the one or more preset conditions being fulfilled, estimating, for said at least one characteristic, a value based on channel characteristic values of reference signals in non-missed frequency bins and, per a missed frequency bin, channel characteristic values determined and stored during a preceding reception occurrence of the missed frequency bin.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are only presented as examples. Although the specification may refer to "an", "one", or "some" embodiment(s) and/or example(s) in several locations, this does not necessarily mean that each such reference is to the same embodiment(s) or example(s), or that a particular feature only applies to a single embodiment and/or single example. Single features of different embodiments and/or examples may also be combined to provide other embodiments and/or examples. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the elements are not restricted by the terms. The terms are used merely for the purpose of distinguishing an element from other elements. For example, a first element could be termed an element or a second element, and similarly, a second element could be also termed a first element or an element without departing from the scope of the present disclosure.

Figure 1:
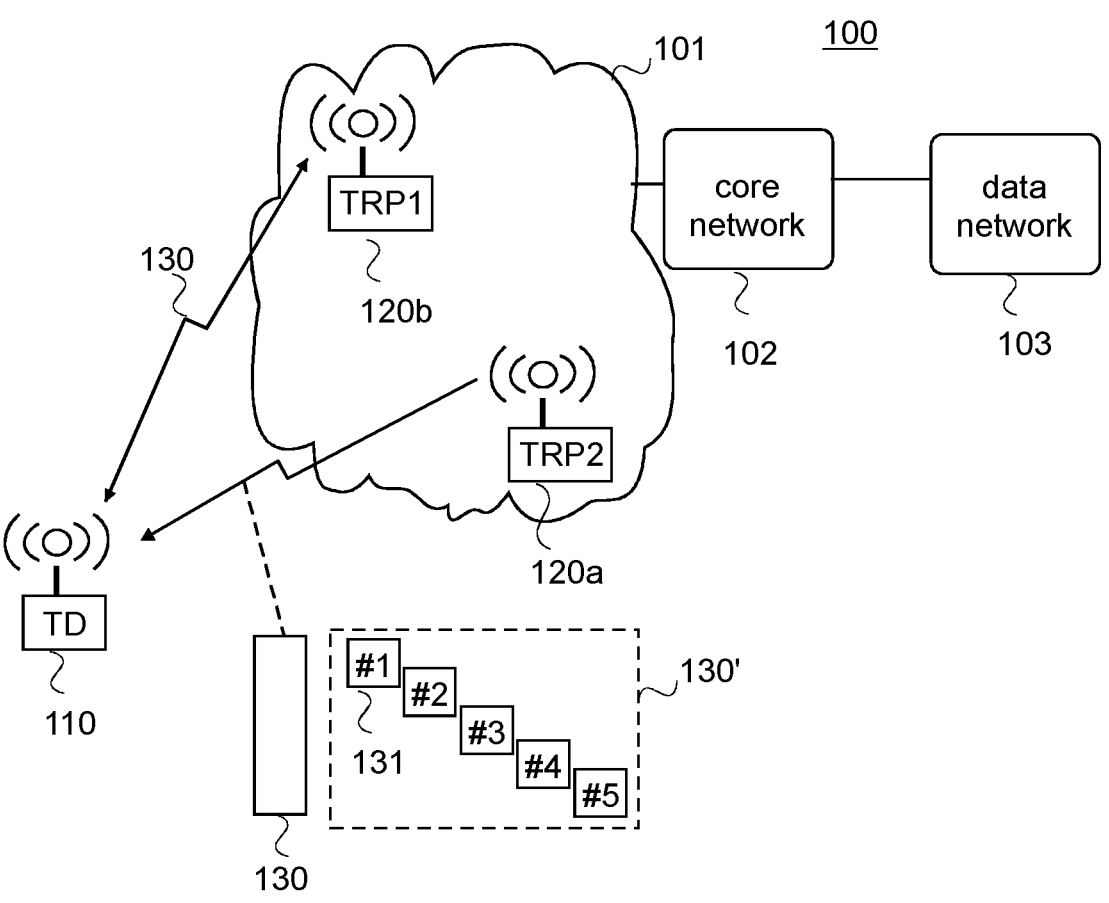
FIG. 1 illustrates an exemplified wireless communication system.

FIG. 1 illustrates an exemplified high-level network architecture 100, only showing some details, the more detailed implementation being irrelevant for the description of examples. The examples are described herein using principles and terminology of 5G and 5G-Advanced. A person skilled in the art may apply the solutions and examples to other communication systems, for example beyond 5G-Advanced, or communication system implementing similar principles and functionalities, possibly with different terms having corresponding meaning, but using some other than 5G technology.

In 5G, 5G-Advanced networks and beyond, it is envisaged that use of smart devices, that may move, will increase thereby posing different latency and accuracy requirements for positioning the smart devices in connected robotics and autonomous systems, for example. A non-limiting list of examples of such services and/or corresponding mobile smart devices include unmanned mobility with fully autonomous connected vehicles, other vehicle-to-everything (V2X) services, or smart industry with different Industrial Internet of Things (IIoT) devices, such as automated guided vehicles or mobile robots or mobile robot arms. Naturally, for positioning of terminal devices, like smart phones or smart wearable devices, including different smart accessories, or other user devices, different latency and accuracy requirements for positioning them may also be posed. Further complexity to positioning create a wide variety of capabilities of different smart devices. For use cases and deployment scenarios relating to industrial sensors, video surveillance, and wearables, which require low device complexity, and/or small form-factor and/or low power consumption, devices (user equipment or terminal devices), called reduced capability devices, have been introduced. A non-limiting list of reduced capability devices include industrial internet of things devices, consumer internet of things devices, different sensors, like pressure sensors, humidity sensors, thermometers, motion sensors, actuators, accelerometers, etc., surveillance cameras, wearable devices, such as smart watches, rings, eHealth related devices, etc., Some of them may be for use cases that include power saving. The power saving may be needed, for example for smart devices comprising non-rechargeable batteries and/or batteries with requirements for longer recharging periods. For example, industrial wireless sensors may require that batteries should last few years, and wearable devices that recharging period should be more than multiple days, for example a week. Discontinuous reception provides means to save energy.

6G networks are expected to adopt flexible decentralized and/or distributed computing systems and architecture and ubiquitous computing, with local spectrum licensing, spectrum sharing, infrastructure sharing, and intelligent automated management underpinned by mobile edge computing, artificial intelligence, short-packet communication and blockchain technologies. Key features of 6G will include intelligent connected management and control functions, programmability, integrated sensing and communication, reduction of energy footprint, trustworthy infrastructure, scalability and affordability. In addition to these, 6G is also targeting new use cases covering the integration of localization and sensing capabilities into system definition to unifying user experience across physical and digital worlds.

Referring to FIG. 1, a radio access network 101 provides wireless access to terminal devices 110 (only one illustrated) via a core network 102 to one or more data networks 103.

The radio access network 101 may be 5G-Advanced network, a non-terrestrial network, or a non-cellular access network, for example a wireless local area network, implementing the concept of user devices, reduced capability user devices, discontinued reception and support for positioning.

To provide the wireless access, the radio access network 101 comprises access devices which may provide one or more cells. There are a wide variety of access devices, including different types of base stations, such as split gNB, transmission-reception points, network-controlled repeaters, donor nodes in integrated access and backhaul (IAB), fixed IAB nodes, mobile IAB nodes mounted on vehicles, for example, and satellites. In the illustrated example two transmission-reception points 120a, 120b are shown, as an example of a positioning arrangement in the radio access network. For positioning a terminal device (TD) 110, a plurality of apparatuses 120a, 120b configured to operate as a transmission-reception point (TRP) may be involved. An apparatus 120a, 120b configured to operate as a transmission-reception point, called herein a transmission-reception point, may be a base station or an access node, or an operational entity comprising one or more antennas in a base station, or an operational entity comprising one or more remote radio heads, or a remote antenna of a base station, or any other set of geographically co-located antennas forming one operational entity, for example an antenna array with one or more antenna elements, for one cell in the radio access network, or for a part of the one cell. In other words, one cell may include one or multiple transmission points, and cells in the radio access network comprise transmission-reception points.

The core network 102 may be based on a non-standalone core network, for example an LTE-based network, or a standalone access network, for example a 5G core network. However, it should be appreciated that the core network 102 may use any technology that enable network services, including positioning services, for example, to be delivered between devices and data networks.

The data network 103 may be any network, like the internet, an intranet, a wide area network, and different remote monitoring and/or data collection services for different use cases, for example for positioning purposes, that may be reached via the data network 103.

The terminal device 110 is a device that may move and/or contain movable parts and is configured to communicate with a radio access network. Different examples of the terminal device 110 have been described above, without limiting terminal devices (apparatuses that may be positioned) to the listed examples. The terminal device 110 may be configured to implement any functionality described below with FIG. 4 to FIG. 8, for example configured to use at least a discontinuous reception as described with FIG. 2.

A terminal device's position may be estimated based at least on measurement results obtained by the terminal device on downlink signal transmissions (e.g. downlink reference signal transmissions) received from one or more transmission-reception points. In 5G and 5G Advanced, a downlink reference signal for positioning is called a positioning reference signal. However, any other term may be used for reference signals for positioning. A downlink reference signal transmission may be a wideband downlink reference signal transmission 130, which the terminal device, for example, a terminal device with a reduced bandwidth and/or with the discontinuous reception, may receive over a time 130' in different frequency sub-bands, also called frequency bins 131, in a frequency hopping manner. In the non-limited illustrated example, the downlink reference signal 130 may be received in five different frequency bins. For example, if the wideband downlink reference signal transmission 130 from the TRP 120a, 120b is Y MHz, and the terminal device has X MHz bandwidth capacity, the number N of the frequency bins is, when assuming that Y is an integer multiple of X, as follows: N=Y/X. In case Y is not an integer multiple of X, it depends on an implementation whether the result is rounded up or rounded down to the nearest integer.

In 5G, 5G Advanced, and beyond, it is envisaged that a terminal device's position is estimated by a location management apparatus (not illustrated in FIG. 1), for example a core network element implementing a location management function, LMF. The LMF manages positioning by, for example, obtaining measurements from the terminal device 110, and by providing assistance data, for example positioning configuration to the terminal device and the transmission reception points to help determine what to monitor and report, or to transmit. However, at least part of the location management function may be distributed to be performed at the radio access network, or even in terminal devices. Hence, herein term location management point (LMP) is used to cover all above listed possibilities. In other words, the term location management point covers any apparatus, including any node or server or device or entity, configured to operate as the location management point to determine (estimate, compute) positions of one or more terminal devices. The location management apparatus may be configured at least to transmit to an apparatus, which is to be positioned in a wireless network, i.e. the terminal device, a positioning configuration for receiving at least reference signals for positioning the apparatus, the positioning configuration defining a plurality of frequency bins for the reference signals, and at least one characteristic whose value is to be estimated based on one or more channel characteristics. The positioning configuration may comprise also other information, such as information on channel characteristic(s) to use and/or information on metric(s), and/or related condition(s), and/or information on positioning accuracy, for example. The location management apparatus 205 may further be configured to receive from the terminal device information reporting a reception occurrence of the downlink reference signals, and to process them. The details how the terminal devices are positioned, after values to report or use for positioning are determined in a terminal device, are not relevant for the implementations described herein, and hence there is no need to describe them in more detail herein.

Figure 2:
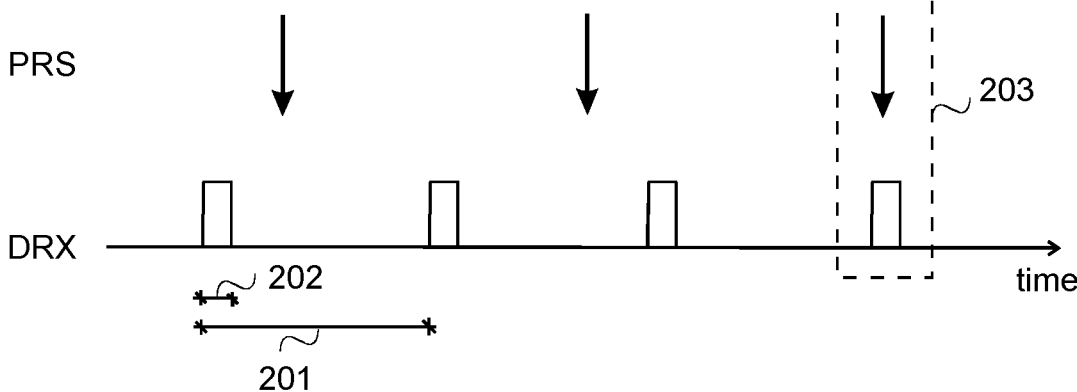
FIG. 2 illustrates timing.

FIG. 2 illustrates timing of downlink reference signals and discontinuous reception.

Referring to FIG. 2, a discontinuous reception DRX configuration of an apparatus defines at least an occurrence cycle 201 of a period 202, during which the apparatus at least monitors downlink transmissions in the wireless network. The discontinuous reception herein covers any type of discontinuous reception including adaptive discontinuous reception, connected state discontinuous reception, idle state discontinuous reception, etc. The downlink transmissions may comprise a downlink reference signals, such as positioning reference signals PRS, transmitted with their transmission periodicity. As can be seen from FIG. 2, at certain times the period and reception of PRS transmission at least overlap so that the apparatus detects 203 the downlink reference signal and can process it. A reception occurrence of a downlink reference signal may comprise one or more detection occurrences 203, for example for different frequency bins. The length of the reception occurrence may be set in the positioning configuration.

Figure 3:
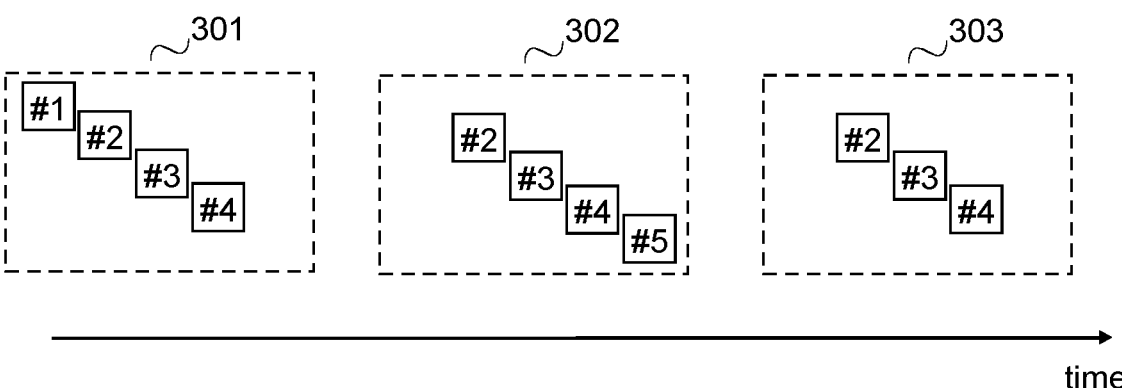
FIG. 3 illustrates an example of reception occurrences of frequency bins.

FIG. 3 illustrates an example of receptions occurrences of frequency bins. Also in the example of FIG. 3 a downlink reference signal may be received in five frequency bins. However, in the illustrated example, during a reception occurrence 301 at time t–2, frequency bins #1, #2, #3 and #4 were received, frequency bin #5 was missed, during a reception occurrence 302 at time t–1, frequency bins #2, #3, #4 and #5 were received, frequency bin #1 was missed, and during a reception occurrence 303 at time t, i.e. the most recent reception occurrence, frequency bins #2, #3, and #4 were received, frequency bins #1 and #5 were missed. When certain conditions are fulfilled, as will be described below in more detail, at time t an estimate for positioning may be determined by using bin #1 received at time t–2, bin #5 received at time t–1, and bins #2, #3, and #4 received at time t.

Figure 4:
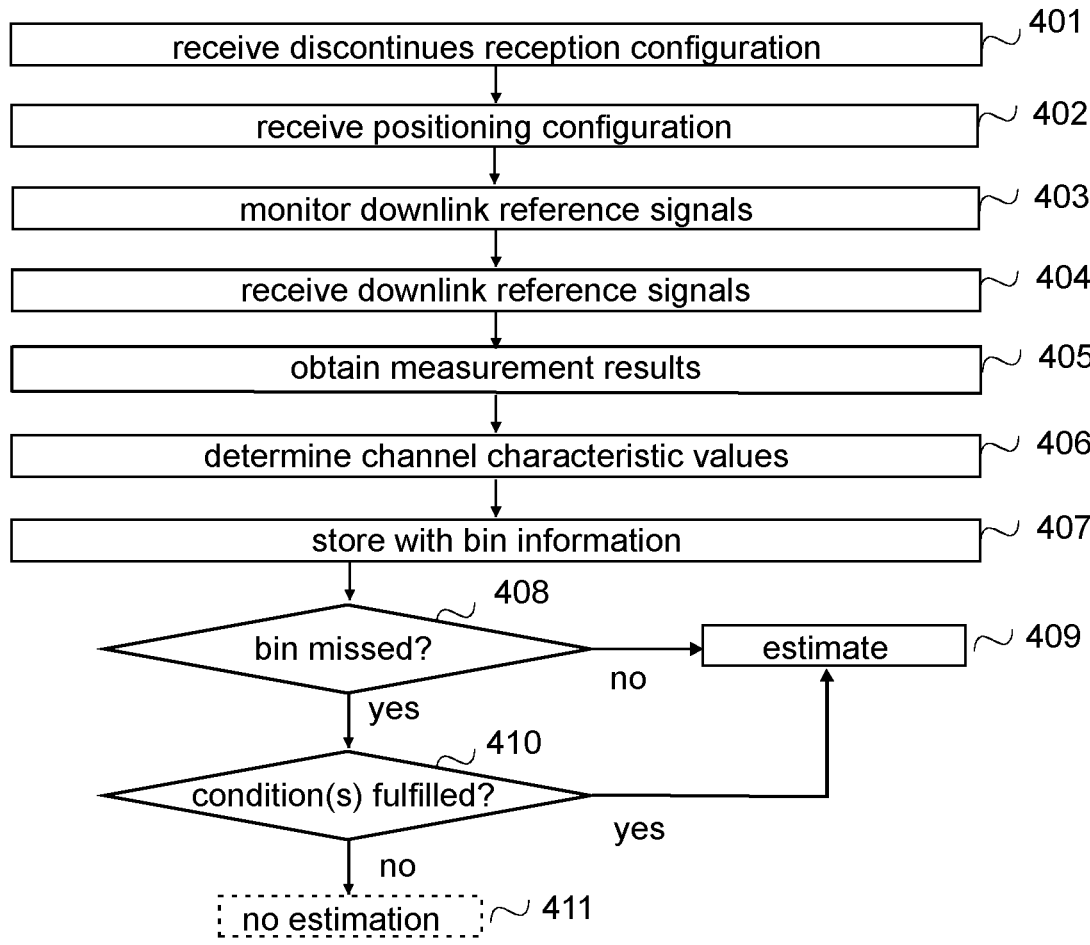
FIG. 4 to FIG. 7 are flow charts illustrating example functionalities.

FIG. 4 illustrates an example functionality of an apparatus to be positioned while the apparatus is configured to use the discontinuous reception.

Referring to FIG. 4, the apparatus receives (block 401) from a wireless network a discontinuous reception configuration, which defines at least an occurrence cycle of a period, during which the apparatus at least monitors downlink transmissions in the wireless network, as described above with FIG. 2. The wireless network may provide the discontinuous reception configuration to the apparatus through dedicated RRC (radio resource control) reconfiguration message (e.g., during handover) or in System Information Block Type 2 (SIB2) broadcasted during initial attach, for example. Further, the apparatus receives (block 402), for example from a location management point, a positioning configuration for receiving at least downlink reference signals for positioning the apparatus. The positioning configuration defines a plurality of frequency bins for the downlink reference signals, and at least one characteristic whose value is to be estimated based on one or more channel characteristics. The frequency bins may be defined directly by the positioning configuration indicating the frequency bins, or indirectly by the positioning configuration indicating the frequency band for the downlink reference signal, wherefrom the apparatus may be configured to determine frequency bins, using the bandwidth the apparatus is supporting. The at least one characteristic, whose value is to be estimated may be time of arrival, angle of arrival and/or relative time of arrival, for example. The one or more channel characteristics may be a channel impulse response (CIR) and/or channel flatness probability (CFP) and/or reference signal received power (RSRP) and/or reference signal received quality (RSRQ) and/or a power-delay-profile (PDP). The length of the power-delay-profile may be configured by the location management point. The location management point may also at least indicate in the positioning configuration channel characteristic(s) to be used, and/or they may be preset to the apparatus.

The apparatus monitors in block 403 during occurrences of the period at least downlink reference signals according to the positioning configuration. When there is within the period a reception occurrence of downlink reference signals, the downlink reference signal are received in block 404 during the reception occurrence, and measurement results of the downlink reference signals received during the reception occurrence are obtained in block 405. For example, the apparatus may perform measurements and determine the measurement results. The apparatus also determines in block 406 from the measurement results channel characteristic values for said one or more channel characteristics per a reference signal transmitting apparatus. The channel characteristic values may be determined per a frequency bin. The channel characteristic values are stored in block 407 at least temporarily with at least information indicating non-missed frequency bins. For example, the channel characteristic values may be stored for a duration of a memory-window-length that may be configured by the location management point, for example in the positioning configuration. In another example, channel characteristic values for a specific frequency bin may be stored until a new measurement result for the specific frequency bin is obtained and new values determined and stored. The non-missed frequency bins may be indicated by using frequency bin identifiers. The channel characteristic values may be stored with a time-stamp, or with corresponding information indicating the reception occurrence time, or without any time information. The time information may be used to define a window for replacement, or to avoid using old values, for example values older than a preset time limit.

Using the example of FIG. 3, and V indicating channel characteristic values, at time t–2 following may be stored: bin #1-V1, bin #2-V2, bin #3-V3, bin #4-V4; at time t–1 following may be stored: bin #2-V5, bin #3-V6, bin #4-V7, bin #5-V8, and at time t following may be stored: bin #2-V9, bin #3-V10, bin #4-V11. It should be appreciated that any way to store the values so that they are associated with corresponding bins may be used.

Further, the apparatus determines in block 408, whether any frequency bin of the plurality of frequency bins was missed during the reception occurrence. A frequency bin may be detected as a missed frequency bin based on scheduling information in the positioning configuration and discontinuous reception cycle. A frequency bin may be detected as missed for other reasons as well. For example, a frequency bin may be considered missed based on poor measurement quality, e.g. it's reception energy or power is low.

If all frequency bins were received, i.e. none missed (block 408: no), during the reception occurrence, values for said at least one characteristic, for example the TOA, is estimated in block 409 per a reference signal transmitting apparatus using channel characteristic values determined using measurement results obtained during the reception occurrence.

In response to the one or more frequency bins being missed during the reception occurrence (block 408: yes), it is determined in block 410, whether one or more preset conditions are fulfilled. The one or more preset conditions may be called channel characteristic conditions. The determining may be performed per a channel characteristic and a missed frequency bin. For example, the determining may be performed by comparing, per a channel characteristic and a missed frequency bin, a difference between the channel characteristic value determined in block 406 and a channel characteristic value determined and stored during a preceding reception occurrence of the missed frequency bin with a corresponding threshold. Depending on an implementation, the comparison may be performed using only one non-missed frequency bin per a missed frequency bin, or the comparison may be performed using all non-missed frequency bins per a missed frequency bin, or any number of non-missed frequency bins per a missed frequency bin. Using the example of FIG. 3 and the reception occurrence at a time t, and a rule that those non-missed frequency bins that are also non-missed frequency bins during a preceding reception occurrence of the missed frequency bin following scenarios are possible. For missed bin #1 following differences may be determined: V9–V2, V10–V2 and V11–V4; and if the differences are below a threshold, condition for bin #1 is fulfilled. Correspondingly, for missed bin #5 following differences may be determined: V9–V5, V10–V6 and V11–V7 and if the differences are below a threshold, condition for bin #5 is fulfilled. In another example, average or mean may be used in comparison, for example, using bin #5, a difference between (V9+V10+V11)/3 and (V5+V6+V7)/3 may be determined. In other words, ideal scenario of a static environment is leveraged to a non-static environment using the principle that the smaller the difference, the more static is the environment and the more reliable are the preceding measurement results for the missed frequency bins.

In the illustrated example it is assumed, that when all missed frequency bins fulfill corresponding conditions, it is determined that the conditions are fulfilled (block 410: yes), meaning that earlier channel characteristic value(s) of the missed frequency bins are usable and will be used. Hence, the process proceeds to block 409 to estimate values for said at least one characteristic, for example the TOA, per a reference signal transmitting apparatus, using for non-missed frequency bins channel characteristic values determined using measurement results obtained during the reception occurrence in block 406, and per a missed frequency bin, channel characteristic values determined and stored during a preceding reception occurrence of the missed frequency bin. Using the example of FIG. 3, values V1, V9, V10, V11 and V8 would be used to estimate TOA. It should be appreciated that other rules to determine in block 410 whether the one or more conditions are fulfilled may be used as well.

In the illustrated example of FIG. 4, if in block 410 it is determined that the one or more conditions are not fulfilled (block 410: no), no estimation of values for said at least one characteristic will be performed for that reception occurrence.

Figure 5:
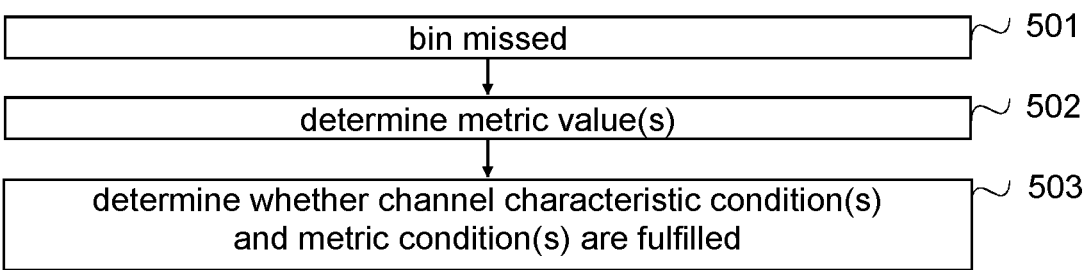
Figure 6:
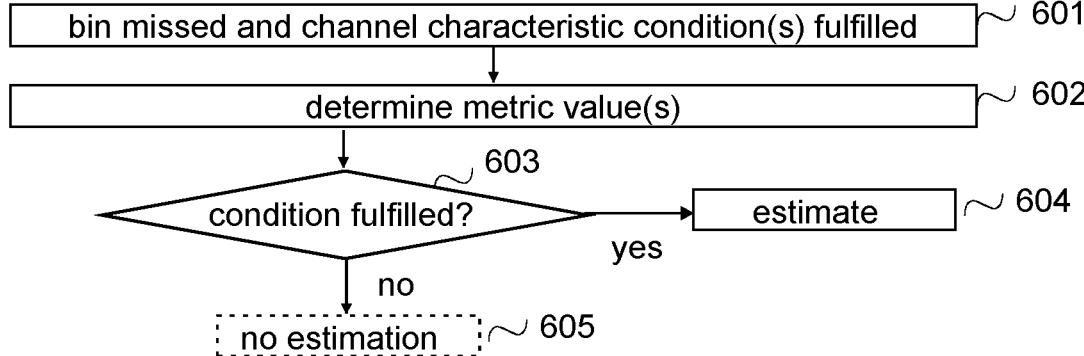
Figure 7:
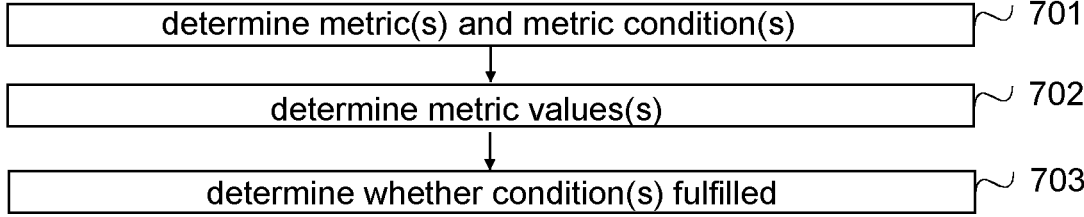

To further increase reliability, in some implementations values for one or more additional metrics to identify correlation factors, i.e. to check a magnitude of change between a current reception occurrence and one or more previous reception occurrences, and whether the values fulfil one or more preset metric conditions may be determined per a reference signal transmitting apparatus. FIG. 5 illustrates a functionality which may happen within block 410 in the example of FIG. 4 and FIG. 6 illustrates a functionality which may happen when in block 410 it is determined that the channel characteristic conditions are fulfilled but before estimating values in block 409. FIG. 7 illustrates a further functionality relating to the metrics, and the functionality may be combined with FIG. 5 and FIG. 6. Depending on an implementation, metric related information, for example an indication of at least one metric whose values are to be determined and/or at least one preset metric condition may be received in the positioning configuration, or otherwise preset to the apparatus. Further, the metric values may be calculated using average or mean of non-missed frequency bins per a reception occurrence (at reception occurrence time).

Referring to FIG. 5, in response to the one or more frequency bins being missed (block 501) during the reception occurrence, for at least one metric, per a metric, a metric value indicating a magnitude of a change of the channel characteristic value between the reception occurrence and at least one of preceding reception occurrences is determined in block 502. A non-limiting list of examples of metrics include a coherence time (CT) and a dynamic time wrapping index (DTW-index). The coherence time is the time over which a propagating wave, such as reference signal may be considered coherent, meaning that its phase is, on average, predictable. In other words, it is a duration of time during which a channel will be static. The dynamic time wrapping (DTW) is an algorithm for measuring the similarity between two temporal sequences. In general, the dynamic time wrapping calculates an optimal match between two given sequences. For example, a value of the DTW index may be determined by measuring similarities of power-delay-profiles in two or more reception occurrences, for example at time t and at time t-n.

When values for the at least one metric have been determined in block 502, it is determined in block 503, whether one or more channel characteristic conditions, described with FIG. 4, are fulfilled and whether, per a metric, whether the metric value fulfills a corresponding preset metric condition. Depending on an implementation, all conditions, or some of them have to be fulfilled, so that previous values for channel characteristic(s) may be used when the at least one characteristic is estimated.

For example, following conditions may be checked in block 503:

$$|(\text{CFP of bin } \#m \text{ at } t{-}n){-}(\text{CFP of bin } \#m \text{ at } t)| \le \text{CFP-threshold}$$

$$|(\text{RSRP of bin } \#m \text{ at } t{-}n){-}(\text{RSRP of bin } \#m \text{ at } t)| \le \text{RSRP-threshold}$$

$$\text{CT}(\text{bin } \#m,(t{-}n),t) \le (t{-}n){-}t$$

$$\text{DTW}(\text{bin } \#m,(t{-}n),t) \ge \text{DTW-threshold}$$

Referring to FIG. 6, in response to the one or more frequency bins being missed (block 601) during the reception occurrence, and the one or more channel characteristic conditions being fulfilled (block 601), for at least one metric, per a metric, a metric value indicating a magnitude of a change of the channel characteristic value between the reception occurrence and at least one of preceding reception occurrences is determined in block 602, for example as described above with FIG. 5. Then it is determined in block 603, per a metric, whether the metric value fulfills a corresponding preset metric condition. Depending on an implementation, all conditions, or some of them have to be fulfilled, so that previous values for channel characteristic(s) may be used when the at least one characteristic is estimated.

For example, following conditions may be checked in block 603:

$$\text{CT}(\text{bin } \#m,(t{-}n),t) \le (t{-}n){-}t$$

$$\text{DTW}(\text{bin } \#m,(t{-}n),t) \ge \text{DTW-threshold}$$

If it is determined that the metric conditions are fulfilled (block 603: yes), the process proceeds to block 604, corresponding to block 409, to estimate values for said at least one characteristic, for example the TOA, per a reference signal transmitting apparatus, using for non-missed frequency bins channel characteristic values determined using measurement results obtained during the reception occurrence, and per a missed frequency bin, channel characteristic values determined and stored during a preceding reception occurrence of the missed frequency bin.

If in block 603 it is determined that the one or more metric conditions are not fulfilled (block 604: no), no estimation of values for said at least one characteristic will be performed (block 605) for that reception occurrence.

In the example of FIG. 6, processing capacity and power is not used in vain to determine metric values which will not change the end result since prior to determining metric values, the one or more channel characteristic conditions have been determined to be fulfilled. If the one or more channel characteristic conditions have been determined not to be fulfilled, the process of FIG. 6 will not be performed.

Referring to FIG. 7, the apparatus may be configured to determine (block 701) the at least one metric, i.e. one or more metrics, for which values are to be determined, and corresponding one or more metric conditions. For example, the apparatus may determine, based on positioning accuracy indicated, a preset metric group and corresponding preset metric conditions. For example, the apparatus may receive in the positioning configuration an indication of the positioning accuracy, based on which and preset configuration, the apparatus determines the one or more metric. In an implementation, similar approach may be used for the one or more channel characteristics as well.

For example, a group of conditions may comprise CFP condition, RSRP condition, CT condition, and DTW condition, for example the ones described with FIG. 5. The apparatus may be configured to determine that when the positioning accuracy is high (for example to within 1 meter), values for CFP, RSRP, CT and DTW are determined (block 702), when at least one frequency bin is missed, and all corresponding conditions are to be fulfilled (block 703) to estimate the at least one characteristic for positioning. The apparatus may be configured to determine that when the position accuracy is medium (for example to within 3 meters), values for CFP, RSRP and CT are determined (block 702), when at least one frequency bin is missed, and a group condition to be fulfilled (block 703) comprises that CFP and CT conditions are to be fulfilled and RSRP condition not to be fulfilled to estimate the at least one characteristic for positioning. In other words, determining DTW may be disabled. The RSRP condition is used as an example of a flexible condition, which for the RSRP takes into account that there may be a sudden drop in RSRP values which may be due to an obstacle or sudden blockage and the "not to be fulfilled" indicates that results "not fulfilled" and "fulfilled" will pass the condition checking. Alternatively, determining the RSRP may be disabled. The apparatus may be configured to determine that when the positioning accuracy is low (for example to within 6 meters), no additional metrics are needed, and values for CFP only are determined), when at least one frequency bin is missed, and CFP condition is the only condition to be fulfilled (block 703) to estimate the at least one characteristic for positioning.

Figure 8:
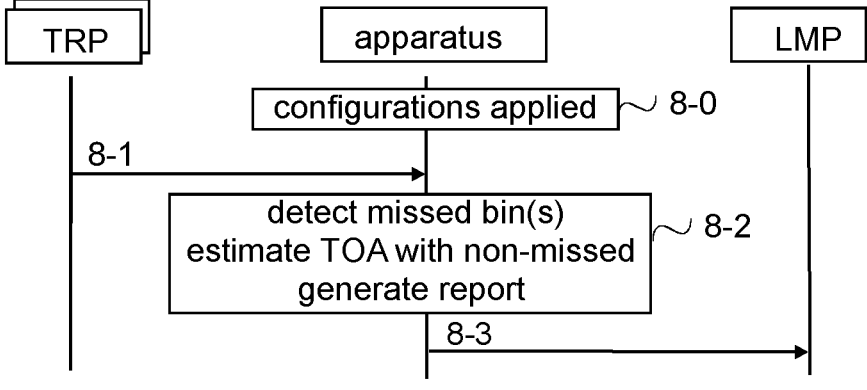
FIG. 8 illustrates an example of information exchange.

FIG. 8 discloses a simplified non-limiting example of information exchange. In the illustrated example the time of arrival, TOA, is used as a non-limiting example of a characteristic for which values are estimated.

Referring to FIG. 8, the apparatus, i.e. the apparatus that is moving and is to be positioned, has been configured (block 5-0) with the discontinuous reception configuration and the positioning configuration for receiving at least downlink reference signals for positioning the apparatus and the configurations are applied (block 8-0), including that during the periods reception occurrences of the downlink reference signals (messages 8-1) are monitored.

In the illustrated example it is assumed that the apparatus detects (block 8-2) that during the reception occurrence one or more frequency bins were missed, but the conditions were met and the apparatus estimates a value for the time of arrival (TOA) of received frequency bins per a transmission-reception point. In other words, the apparatus estimates, for said at least one characteristic, a value based on measurement results of downlink reference signals in non-missed frequency bins, and earlier channel characteristic value(s) determined for missed frequency bins, using any of the examples described above. The apparatus then generates information reporting the reception occurrence to include estimated one or more values for TOA in the example, and to at least indicate the one or more frequency bins missed by including to the information identifying information of the one or more frequency bins missed. For example, the identifying information may be a combination of an identifier of the transmission-reception point, downlink reference signal resource set identifier and/or a bin identifier.

The apparatus then transmits the information (message 8-3) to the location management point LMP, or to the wireless network, towards the LMP.

The blocks, related functions, and information exchanges (messages/signals) described above by means of FIG. 1 to FIG. 8 are in no absolute chronological order, and some of them may be performed simultaneously or in an order differing from the given one. Other functions can also be executed between them or within them, and other information may be transmitted, and/or other rules applied. Some of the blocks or part of the blocks or one or more pieces of information can also be left out or replaced by a corresponding block or part of the block or one or more pieces of information. Furthermore, some of the blocks in one example may be combined with another example.

Figure 9:
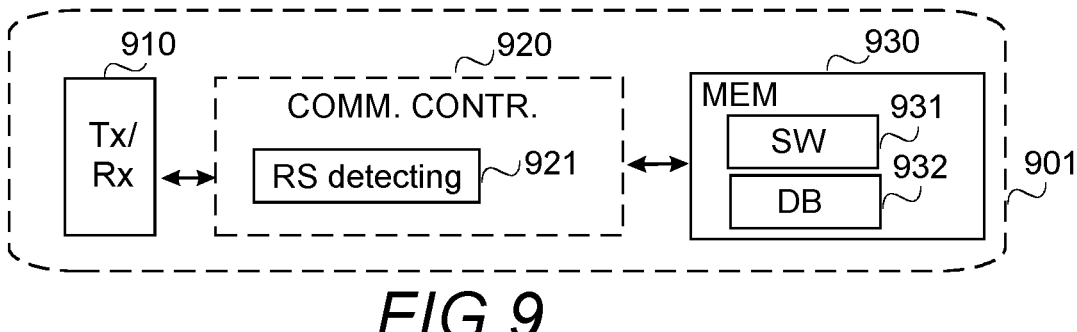
FIG. 9 is a schematic block diagram.

FIG. 9 illustrates an apparatus 901 according to some embodiments. The apparatus 901 may be an apparatus or a reduced capability device, e.g. an electrical device, for use cases wherein the apparatus is to be positioned, for example. Different examples of such apparatuses are described above.

The apparatus 901 may comprise one or more communication control circuitry 920, such as at least one processor, and at least one memory 930, including one or more algorithms 931, such as a computer program code (software) wherein the at least one memory and the computer program code (software) are configured, with the at least one processor, to cause the apparatus to carry out any one of the exemplified functionalities of the apparatus, described above with any of FIG. 1 to FIG. 8. Said at least one memory 930 may also comprise at least one database, 932. Said at least one memory 930 may be configured to store values determined for channel characteristic(s) and/or one or more preset conditions, for example.

According to an embodiment, there is provided an apparatus comprising at least one processor; and at least one memory storing instructions that, when executed by the at least one processor, cause the apparatus to at least: receive from a wireless network a discontinuous reception configuration, which defines at least an occurrence cycle of a period, during which the apparatus at least monitors transmissions towards the apparatus in the wireless network; to receive a positioning configuration for receiving at least reference signals for positioning the apparatus, the positioning configuration defining a plurality of frequency bins for the reference signals, and at least one characteristic whose value is to be estimated based on one or more channel characteristics; monitor during occurrences of the period at least reference signals according to the positioning configuration; receive, during one or more period within a reception occurrence reference signals according to the positioning configuration; obtain measurement results of the reference signals received during the reception occurrence; determine from the measurement results channel characteristic values for said one or more channel characteristics per a reference signal transmitting apparatus; store the channel characteristic values at least temporarily with information indicating non-missed frequency bins; determine, whether any frequency bin of the plurality of frequency bins was missed during the reception occurrence; determine, in response to the one or more frequency bins being missed during the reception occurrence, whether one or more preset conditions are fulfilled, by comparing, per a channel characteristic and a missed frequency bin, a difference between the channel characteristic value and a channel characteristic value determined and stored during a preceding reception occurrence of the missed frequency bin with a corresponding threshold; and estimate values for said at least one characteristic per a reference signal transmitting apparatus, wherein when one or more frequency bins are missed and the one or more preset conditions are fulfilled, for said at least one characteristic, a value is estimated based on channel characteristic values of reference signals in non-missed frequency bins and, per a missed frequency bin, channel characteristic values determined and stored during a preceding reception occurrence of the missed frequency bin.

Referring to FIG. 9, the one or more communication control circuitries 920 of the apparatus 901 comprise at least a reference signal (RS) detecting circuitry 921 which is configured to perform reference signal monitoring, reception and value obtaining, according to embodiments. To this end, the reference signal circuitry 921 of the apparatus 901 is configured to carry out at least some of the functionalities described above, e.g., by means of FIG. 2 to FIG. 8, using one or more individual circuitries.

Referring to FIG. 9, the memory 930 may be implemented using any suitable data storage technology, such as semiconductor based memory devices, flash memory, magnetic memory devices and systems, optical memory devices and systems, fixed memory and removable memory.

Referring to FIG. 9, the apparatus 901 may further comprise different interfaces 910 such as one or more communication interfaces (TX/RX) comprising hardware and/or software for realizing communication connectivity according to one or more communication protocols. The one or more communication interfaces 910 may enable connecting to the Internet and/or to a core network of a wireless communications network and/or to a radio access network and/or to other apparatuses within range of the apparatus. The one or more communication interface 910 may provide the apparatus with communication capabilities to communicate in a cellular communication system and enable communication to different network nodes or elements. The one or more communication interfaces 910 may comprise standard well-known components such as an amplifier, filter, frequency-converter, (de)modulator, and encoder/decoder circuitries, controlled by the corresponding controlling units, and possibly one or more antennas.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In an embodiment, at least some of the processes described in connection with FIG. 1 to FIG. 8 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIG. 1 to FIG. 8 or operations thereof.

Embodiments and examples as described may also be carried out in the form of a computer process defined by a computer program or portions thereof. Embodiments of the functionalities described in connection with FIG. 1 to FIG. 8 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. The term "non-transitory," as used herein, is a limitation of the medium itself (i.e., tangible, not a signal) as opposed to a limitation on data storage persistency (e.g., RAM vs. ROM).

Coding of software for carrying out the embodiments as shown and described is well within the scope of a person of ordinary skill in the art.

Even though the embodiments have been described above with reference to examples according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising at least one processor; and at least one memory storing instructions that, when executed by the at least one processor, cause the apparatus to perform:

receiving from a wireless network a discontinuous reception configuration, which defines at least an occurrence cycle of a period, during which the apparatus at least monitors transmissions towards the apparatus in the wireless network;

receiving a positioning configuration for receiving at least reference signals for positioning the apparatus, the positioning configuration defining a plurality of frequency bins for the reference signals, and at least one characteristic whose value is to be estimated based on one or more channel characteristics;

monitoring during occurrences of the period at least reference signals according to the positioning configuration;

receiving, during one or more periods, within a reception occurrence, reference signals according to the positioning configuration;

obtaining measurement results of the reference signals received during the reception occurrence;

determining from the measurement results channel characteristic values for said one or more channel characteristics per a reference signal transmitting apparatus;

storing the channel characteristic values at least temporarily with information indicating non-missed frequency bins;

determining, whether any frequency bin of the plurality of frequency bins was missed during the reception occurrence;

determining, in response to the one or more frequency bins being missed during the reception occurrence, whether one or more preset conditions are fulfilled, by comparing, using at least one non-missed frequency bin, per a channel characteristic, a difference between the channel characteristic value determined at the reception occurrence and a channel characteristic value determined and stored during a preceding reception occurrence of the missed frequency bin with a corresponding threshold; and estimating values for said at least one characteristic per a reference signal transmitting apparatus, the means for estimating being configured, in response to the one or more frequency bins being missed and the one or more preset conditions being fulfilled, to estimate, for said at least one characteristic, a value based on channel characteristic values of reference signals in non-missed frequency bins and, per a missed frequency bin, channel characteristic values determined and stored during a preceding reception occurrence of the missed frequency bin.

2. The apparatus of claim 1, the at least one memory storing instructions that, when executed by the at least one processor, further cause the apparatus to perform:

determining, in response to the one or more frequency bins being missed during the reception occurrence, for at least one metric, per a metric, a metric value indicating a magnitude of a change of the channel characteristic value between the reception occurrence and at least one of preceding reception occurrences;

wherein the determining, whether the one or more preset conditions are fulfilled, comprises determining, per a metric, whether the metric value fulfils a corresponding preset metric condition.

3. The apparatus of claim 2, wherein the determining a metric value for the at least one metric comprises determining metric values per a frequency bin that is a non-missed frequency bin in the reception occurrence and in the at least one of preceding reception occurrences.

4. The apparatus of claim 2, wherein the determining a metric value for the at least one metric comprises determining metric values using average of non-missed frequency bins per a reception occurrence.

5. The apparatus of claim 2, wherein the means determining, whether the one or more preset conditions are fulfilled, comprises determining, per a metric group comprising the at least one metric, whether metric values fulfill a preset metric group condition.

6. The apparatus of claim 5, the at least one memory storing instructions that, when executed by the at least one processor, further cause the apparatus to perform:

determining, based on positioning accuracy indicated, the preset metric group and the preset metric group condition.

7. The apparatus of claim 2, wherein the determining the metric value for the at least one metric determining the metric value in response to the one or more preset conditions being fulfilled.

8. The apparatus of claim 2, the at least one memory storing instructions that, when executed by the at least one processor further cause the apparatus to perform:

receiving in the positioning configuration information indicating the at least one metric.

9. The apparatus of claim 2, the at least one memory storing instructions that, when executed by the at least one processor, further cause the apparatus to perform:

receiving in the positioning configuration at least one preset metric condition.

10. The apparatus of claim 1, the at least one memory storing instructions that, when executed by the at least one processor, further cause the apparatus to perform:

generating, in response to the one or more frequency bins being missed during the reception occurrence, information reporting the reception occurrence to at least indicate the one or more frequency bins missed;

generating a report comprising the values estimated, wherein the means are configured, in response to the one or more frequency bins being missed, to include the information generated to the report; and transmitting said report.

11. The apparatus of claim 1, wherein the reference signals are downlink reference signals for positioning.

12. A method comprising:

receiving from a wireless network a discontinuous reception configuration, which defines at least an occurrence cycle of a period, during which the apparatus at least monitors transmissions towards the apparatus in the wireless network;

receiving a positioning configuration for receiving at least reference signals for positioning the apparatus, the positioning configuration defining a plurality of frequency bins for the reference signals, and at least one characteristic whose value is to be estimated based on one or more channel characteristics;

monitoring during occurrences of the period at least reference signals according to the positioning configuration;

receiving, during one or more periods, within a reception occurrence reference signals according to the positioning configuration;

obtaining measurement results of the reference signals received during the reception occurrence;

determining from the measurement results channel characteristic values for said one or more channel characteristics per a reference signal transmitting apparatus;

storing the channel characteristic values at least temporarily with information indicating non-missed frequency bins;

determining, whether any frequency bin of the plurality of frequency bins was missed during the reception occurrence;

determining, in response to the one or more frequency bins being missed during the reception occurrence, whether one or more preset conditions are fulfilled, by comparing, using at least one non-missed frequency bin, per a channel characteristic, a difference between the channel characteristic value determined at the reception occurrence and a channel characteristic value determined and stored during a preceding reception occurrence of the missed frequency bin with a corresponding threshold; and estimating values for said at least one characteristic per a reference signal transmitting apparatus, the estimating comprising, in response to the one or more frequency bins being missed and the one or more preset conditions being fulfilled, estimating, for said at least one characteristic, a value based on channel characteristic values of reference signals in non-missed frequency bins and, per a missed frequency bin, channel characteristic values determined and stored during a preceding reception occurrence of the missed frequency bin.

13. A non-transitory computer readable medium comprising instructions, which, when executed by an apparatus, cause the apparatus to perform at least the following:

receiving from a wireless network a discontinuous reception configuration, which defines at least an occurrence cycle of a period, during which the apparatus at least monitors transmissions towards the apparatus in the wireless network;

receiving a positioning configuration for receiving at least reference signals for positioning the apparatus, the positioning configuration defining a plurality of frequency bins for the reference signals, and at least one characteristic whose value is to be estimated based on one or more channel characteristics;

monitoring during occurrences of the period at least reference signals according to the positioning configuration;

receiving, during one or more periods within a reception occurrence reference signals according to the positioning configuration;

obtaining measurement results of the reference signals received during the reception occurrence;

determining from the measurement results channel characteristic values for said one or more channel characteristics per a reference signal transmitting apparatus;

storing the channel characteristic values at least temporarily with information indicating non-missed frequency bins;

determining, whether any frequency bin of the plurality of frequency bins was missed during the reception occurrence;

determining, in response to the one or more frequency bins being missed during the reception occurrence, whether one or more preset conditions are fulfilled, by comparing, using at least one non-missed frequency bin, per a channel characteristic, a difference between the channel characteristic value determined at the reception occurrence and a channel characteristic value determined and stored during a preceding reception occurrence of the missed frequency bin with a corresponding threshold; and estimating values for said at least one characteristic per a reference signal transmitting apparatus, the estimating comprising, in response to the one or more frequency bins being missed and the one or more preset conditions being fulfilled, estimating, for said at least one characteristic, a value based on channel characteristic values of reference signals in non-missed frequency bins and, per a missed frequency bin, channel characteristic values determined and stored during a preceding reception occurrence of the missed frequency bin.

*   *   *   *   *